US010856665B2

United States Patent
Hesse

(10) Patent No.: US 10,856,665 B2
(45) Date of Patent: Dec. 8, 2020

(54) SEATING FURNITURE WITH HEIGHT-ADJUSTABLE HEADREST

(71) Applicant: Ferdinand Lusch GmbH & Co. KG, Bielefeld (DE)

(72) Inventor: Detlef Hesse, Verl (DE)

(73) Assignee: Ferdinand Lusch GmbH & Co. KG, Bielefeld (DE)

( * ) Notice: Subject to any disclaimer, the term of this patent is extended or adjusted under 35 U.S.C. 154(b) by 0 days.

(21) Appl. No.: 16/243,308

(22) Filed: Jan. 9, 2019

(65) Prior Publication Data

US 2019/0223606 A1    Jul. 25, 2019

(30) Foreign Application Priority Data

Jan. 25, 2018   (DE) .................. 10 2018 101 721

(51) Int. Cl.
| | |
|---|---|
| *A47C 7/38* | (2006.01) |
| *B60N 2/821* | (2018.01) |
| *B60N 2/829* | (2018.01) |
| *A47C 17/04* | (2006.01) |

(52) U.S. Cl.
CPC ............... *A47C 17/04* (2013.01); *A47C 7/38* (2013.01); *B60N 2/821* (2018.02); *B60N 2/829* (2018.02)

(58) Field of Classification Search
CPC .......... B60N 2/821; B60N 2/829; B60N 2/85; B60N 2/865; A47C 7/38
See application file for complete search history.

(56) References Cited

U.S. PATENT DOCUMENTS

| | | | | |
|---|---|---|---|---|
| 4,668,014 | A | * | 5/1987 | Boisset .................. B60N 2/853 297/408 |
| 2012/0013155 | A1 | * | 1/2012 | Hwang .................. B60N 2/002 297/216.12 |
| 2014/0035337 | A1 | * | 2/2014 | Jarry .................... B60N 2/0232 297/344.1 |
| 2016/0286959 | A1 | | 10/2016 | Sartisohn |
| 2017/0259715 | A1 | * | 9/2017 | Heo ........................ B60N 2/80 |

(Continued)

FOREIGN PATENT DOCUMENTS

| | | |
|---|---|---|
| DE | 8707257 U1 | 8/1987 |
| DE | 202007006758 U1 | 8/2007 |
| DE | 102011017301 A1 | 10/2012 |

(Continued)

*Primary Examiner* — Timothy J Brindley
(74) *Attorney, Agent, or Firm* — The Webb Law Firm

(57) ABSTRACT

The invention relates to seating furniture, in particular an armchair or sofa, with at least one backrest, at least one headrest, and at least one headrest adjustment. The headrest is held adjustable relative to the backrest by means of the headrest adjustment. The headrest adjustment has two height-adjustable positioning struts bearing the headrest and each is guided via a separate guide for adjusting the at least one headrest from the lower position into the upper position and back so that the headrests or the headrest adjustments are less prone to jamming or wedging, without disproportionate manufacturing costs. The guides each have a gear rack element and a gear wheel element meshing with the gear rack element when adjusting the headrest from the lower position to the upper position and back. The gear wheel elements are connected to one another in a torsion-resistant manner via a synchronous strut.

17 Claims, 7 Drawing Sheets

(56) References Cited

U.S. PATENT DOCUMENTS

2019/0069682 A1* 3/2019 Liu ................... A47C 20/041

FOREIGN PATENT DOCUMENTS

| DE | 102014109010 A1 | | 5/2015 | | |
|---|---|---|---|---|---|
| DE | 102014219166 A1 | * | 3/2016 | ............ | B60N 2/815 |
| EP | 0931690 A1 | | 7/1999 | | |
| EP | 3372445 A1 | * | 9/2018 | ............ | B60N 2/818 |
| FR | 3062611 A1 | * | 8/2018 | ............ | B60N 2/821 |
| JP | 200025504 A | | 1/2000 | | |
| JP | 2017171074 A | * | 9/2017 | ............ | B60N 2/829 |
| WO | WO-2010123503 A1 | * | 10/2010 | ............... | B60N 2/85 |

* cited by examiner

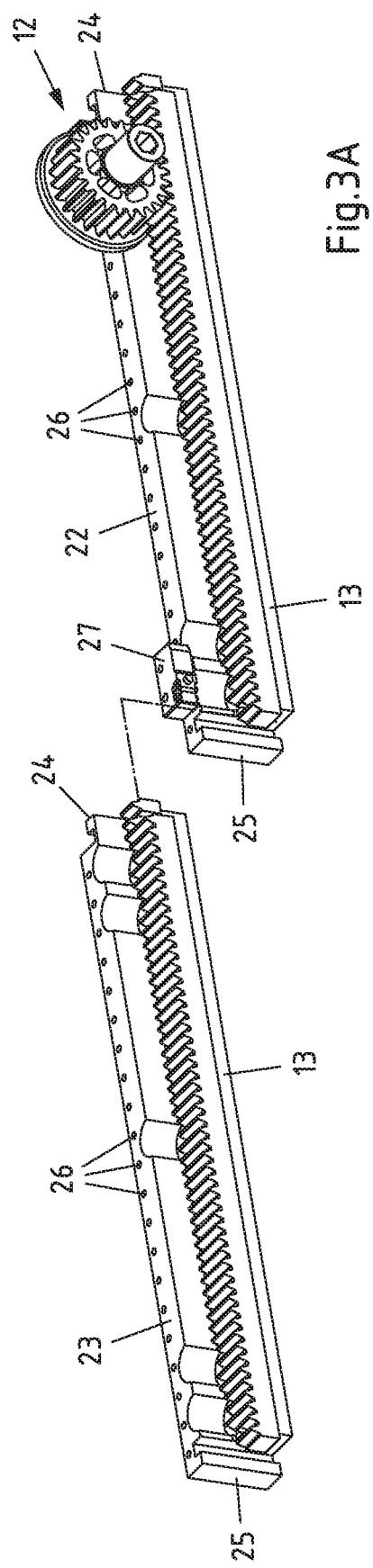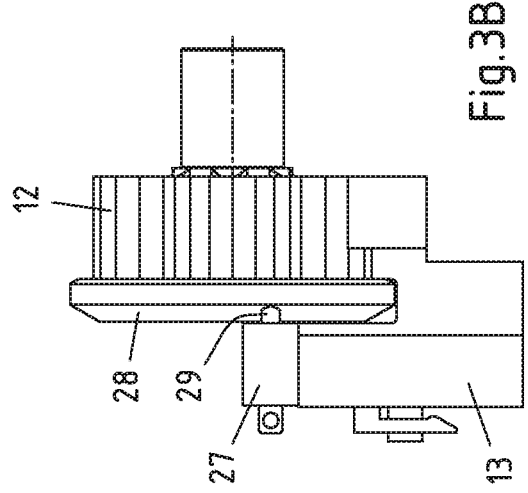
Fig.3A
Fig.3B

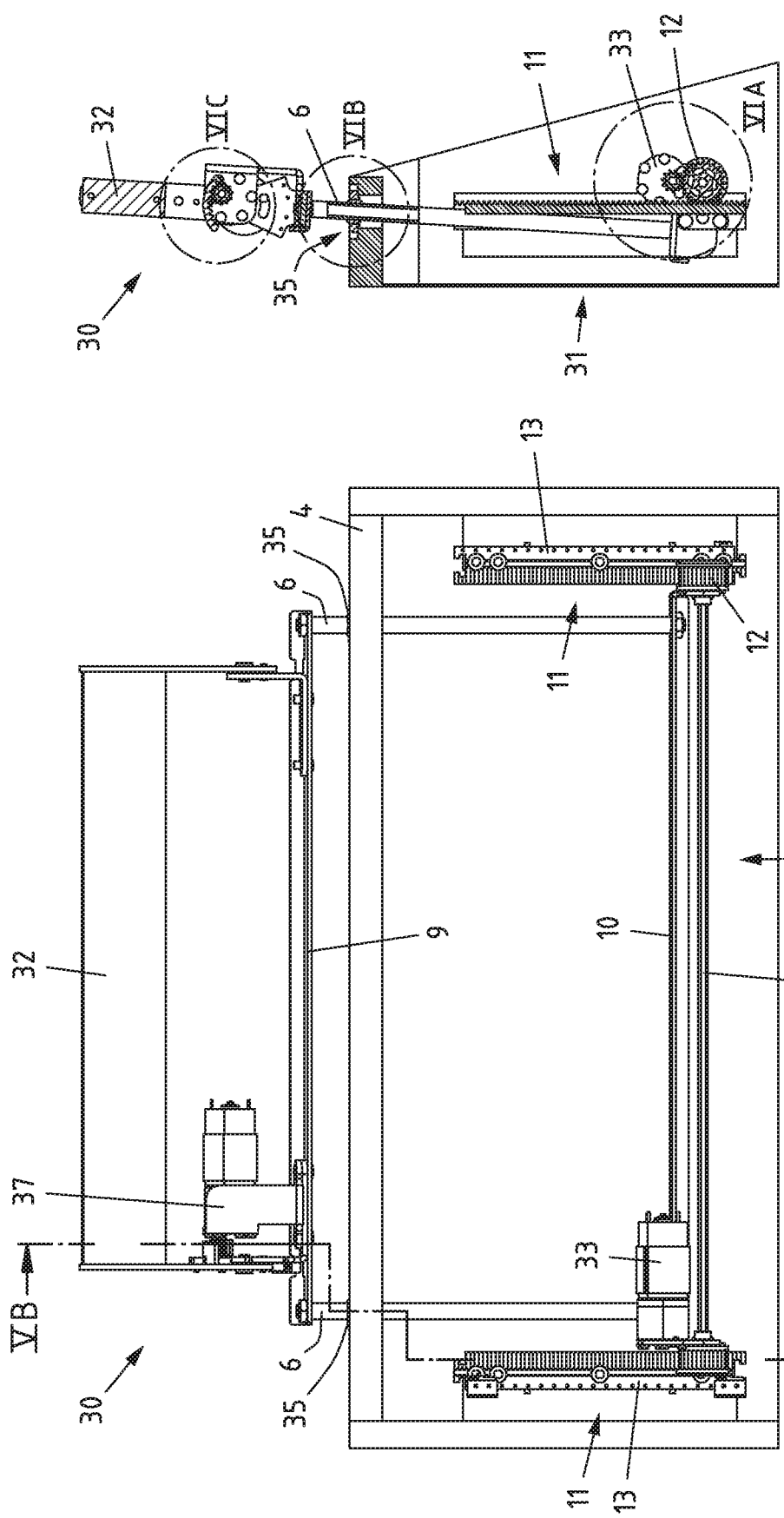

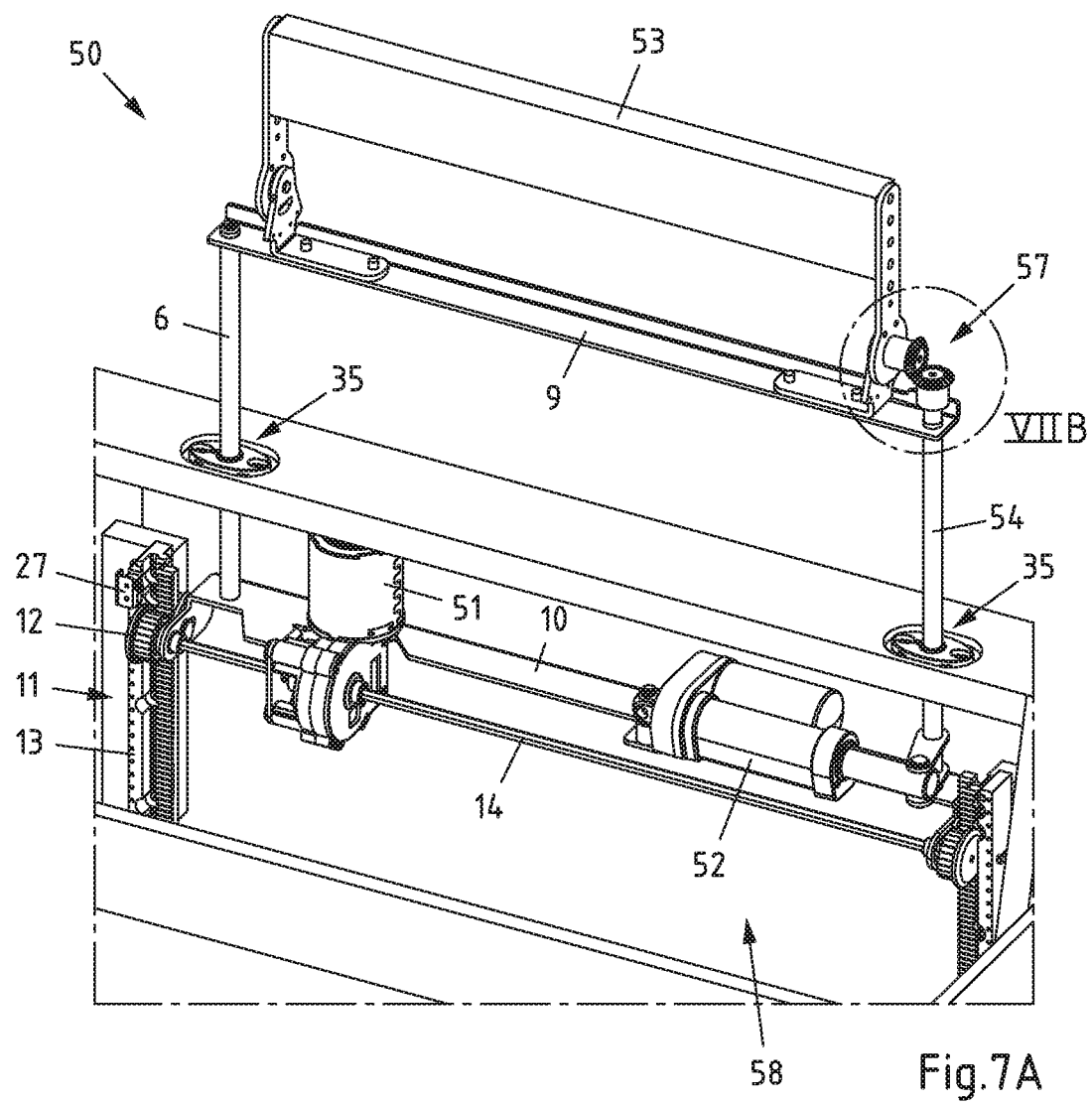
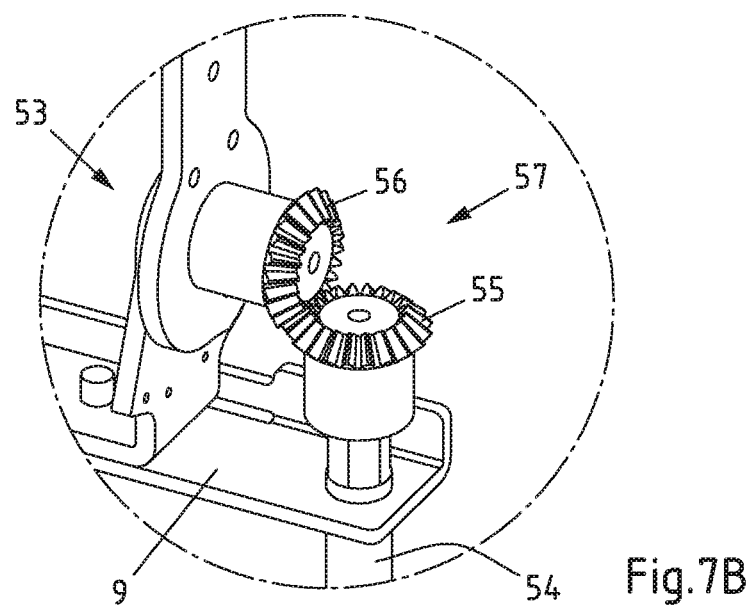
Fig.7A
Fig.7B

SEATING FURNITURE WITH HEIGHT-ADJUSTABLE HEADREST

CROSS-REFERENCE TO RELATED APPLICATION

This application claims priority to German Patent Application No. 10 2018 101 721.9 filed Jan. 25, 2018, the disclosure of which is hereby incorporated in its entirety by reference.

FIELD OF THE INVENTION

The invention relates to a seating furniture, in particular an armchair or sofa, with at least one backrest, at least one headrest and at least one headrest adjustment, wherein the headrest is held adjustable by means of the headrest adjustment relative to the at least one backrest at least from a lower position into an upper position, wherein the headrest adjustment has two height-adjustable positioning struts bearing the headrest and each guided via a separate guide for adjusting the at least one headrest from the lower position into the upper position and back.

BACKGROUND OF THE INVENTION

Seating furniture with height-adjustable headrests, which are also referred to as head supports, is known in various embodiments and allows the user of the furniture to occupy a comfortable sitting and/or lying position. Typically, in addition to a headrest that can be height-adjusted by means of a headrest adjustment, this seating furniture also comprises a frame and a backrest, wherein the headrest adjustment is integrated into the frame and/or the backrest in a manner as invisible as possible. The frame is predominantly a chassis, on which attachment parts such as side parts, at least one backrest, at least one armrest and/or at least one seat can be mounted. Generally, the chassis themselves stand on the ground and thus usually have at least one base. In addition, seating furniture is usually formed as an armchair or sofa.

So that the user can occupy various different comfortable positions on the seating furniture, the headrests can be formed to be height-adjustable between at least one lower position and at least one upper position. For example, the user can then adjust the headrest from a lying position into the lower position and from a sitting position into an upper position. Any interim positions are also conceivable.

To adjust the headrest, this can be connected to the backrest and/or the frame via height-adjustable positioning struts. The struts are then guided along at least one guide as required in order to bring about a comfortable adjustment of the headrest. However, the comfort is also influenced by the distance of the positioning struts from one another. The wider the distance between the positioning struts, the more likely it is for jamming and therefore wedging of the headrest and/or headrest adjustment to occur. At the same time, with greater distances between the positioning struts, wider headrests can be provided which in turn increases the comfort for the user. To facilitate greater distances between the positioning struts, very stable and sturdy guides have been proposed which should prevent jamming of the headrest or headrest adjustment. However, completely satisfactory results have not yet been realised here, particularly as stable and sturdy guides lead to an unwanted increase in manufacturing costs. Thus, further optimisation is required in this regard.

SUMMARY OF THE INVENTION

The object of the present invention is therefore to design and refine the seating furniture mentioned at the outset and previously described in detail such that the headrest or the headrest adjustment is less prone to jamming or wedging, without having to take on disproportionate manufacturing costs.

This object is achieved with seating furniture according to the preamble of claim 1, in that the guides each have a gear rack element and a gear wheel element meshing with the gear rack element when adjusting the headrest from the lower position to the upper position and back, and in that the gear wheel elements are connected to one another in a torsion-resistant manner via a synchronous strut.

By using guides with gear rack elements and gear wheel elements which are each assigned to different positioning struts, a defined adjustment is provided for each positioning strut. The adjustment is resulting from each gear wheel element rolling on an associated gear rack element, wherein the teeth of the gear wheel element and of the associated gear rack element engage with one another. By means of the synchronous struts connecting the gear wheel elements, it is also ensured that the gear wheel elements always move synchronously to one another. Thus, the positioning struts are adjusted in their height synchronously to one another so that jamming of the headrest or the headrest adjustment can be reliably avoided. In other words, by means of the synchronous struts it can be achieved that the gear wheel elements only rotate synchronously to one another. As required, one gear wheel element then does not rotate alone, but only ever together with the respective other gear wheel element. It can also be provided that the speed of rotation, the circumferential speed and/or the angular speed of the gear wheel elements is in each case identical. Constructively, this is particularly simple to achieve by means of similar gear wheel elements and similar gear rack elements, although in principle a different embodiment of the gear wheel elements and the gear rack elements would also allow a synchronous movement of the positioning struts with different speeds of rotation, circumferential speeds and/or angular speeds.

The gear wheel elements must not necessarily be formed as a gear wheel with circumferential teeth. For example, it can be sufficient for a circular segment or a curved segment to be provided with teeth and/or a gear ring is provided. The gear wheel elements can also have elements in addition to a mere gear wheel or similar. In the same way, it is not essential that the gear rack element has a linear gear rack section. The gear rack section can, at least slightly, be curved or bent. The gear rack element can also be added to with further elements in addition to the gear rack section. Nevertheless, constructively it is particularly simple and thus preferable if the gear wheel element has a gear wheel and/or the gear rack element has a gear rack in the traditional sense.

In a first particularly preferred embodiment of the seating furniture, the synchronous strut is coaxially connected to the gear wheel elements. Thus, only a little installation space is required for the synchronous strut and at least a identical speed of rotation, circumferential speed and/or angular speed of the two gear wheel elements can be ensured. Consequently, this cannot lead to jamming or wedging of the headrest. In this connection, from a constructive point of view it is particularly preferable if the synchronous strut is arranged coaxially to the gear wheel elements. Adjusting the headrest then only leads to a rotation of the synchronous strut about its longitudinal axis and as required a height adjustment of the synchronous strut, whereby installation space can be saved.

Seating furniture can be produced particularly flexibly with different height adjustment of the headrest if at least one gear rack element is formed of several parts, in particular over its length. In the case of longer travel distances, the gear rack elements can then be simply composed from more parts than with seating furniture with shorter adjustment travel distances of the headrest. The length of the gear rack element can thus be flexibly adapted to requirements. It is particularly simple but expedient if the gear rack elements are assembled from two parts. However, three or more individual parts are also conceivable. The modular construction of the gear rack elements is then particularly effective if the gear rack elements are constructed from identical parts, i.e. the same or similar individual parts. This reduces the manufacturing costs and if required also the storage costs for the individual parts of the gear rack elements. Alternatively or additionally, a simple mounting of the gear rack elements can be achieved in that the individual parts of the gear rack elements are formed for a positive interlocking of one another. Thus, the opposing longitudinal ends of the individual parts have locking profiles formed correspondingly to one another. These locking profiles are then preferably formed as corresponding tongue and groove profiles.

An expedient flexibility when mounting the seating furniture can alternatively or additionally be achieved if at least one gear rack element has a range of recesses for mounting at least one end switch to limit the adjustment track of the headrest in various positions, and in particular for a motorised adjustment of the headrest. The recesses facilitate the screwing-in of the end switches which can thus be easily provided at different but nevertheless defined positions. Thus, different height adjustments can be realised.

Independently of this, a reliable switching off of a motorised drive is then achieved if an end switch has a push button for actuating in a direction at least substantially parallel to the synchronous strut and/or at least substantially parallel to the axis of rotation of the corresponding gear wheel element. In a vertical orientation of the push button, even small position deviations can contribute to an unreliable actuation of the end switch.

To be able to ensure safe and reliable meshing of the gear rack element and gear wheel element it can be expedient if at least one gear wheel element is formed and arranged such that the corresponding gear rack element is engaged behind in an interlocking manner, in particular engaged around, while the headrest is adjusted from the lower position into the upper position and back. Indeed, other elements, such as the synchronous strut and/or transverse strut, can also provide a reliable interlocking between the gear rack elements and the gear wheel elements. However, this is possibly costlier in terms of construction or functionally disadvantageous. In this context, an interlocking in two spatial directions perpendicular to one another is particularly expedient, in particular if the corresponding plane is oriented perpendicular to the gear rack element and/or at least substantially horizontally.

The comfort of the, in particular manual, adjustment for the user can be increased if at least one gear wheel element is directly or indirectly assigned a damping element. This damping element can then oppose the adjustment of the headrest downwards with a greater resistance than an adjustment of the headrest upwards. This can be achieved, for instance, by means of a spring means or by means of a rotation damper with one-sided free run. The latter can be rotated in one direction with a lower resistance than in the opposing direction. For example, if the headrest is manually adjusted, it can be provided that the headrest is moved independently from its upper end position into the lower initial position if a possible locking mechanism is released. As a result of the damping, it can be achieved that the headrest is slowly moved downwards. However, the movement of the headrest back into the upper end position is opposed by a much lower resistance from the damper so as not to make it unnecessarily difficult to manually pull out the headrest into the upper end position.

The headrest adjustment and thus the headrest can be provided with an increased stability if the positioning struts are securely connected to one another via at least one transverse strut. As the positioning struts are connected at least via the head support, it is a good idea if the transverse strut is arranged below the upper edge of the backrest and/or in the region of the headrest adjustment and/or in the region of the guides. To avoid additional guide elements, the transverse strut can be configured and arranged so as to be height-adjustable together with the headrest. A further increase in stability can thus be achieved as required by connecting the positioning struts to the guides via the transverse strut.

To be able to lock the headrest itself at least in the upper end position and/or the lower initial position of the headrest with a manual adjustment, a lift adjuster can be provided. It is thus constructively simple if the lift adjuster is connected to the transverse strut and/or the synchronous strut. The lift adjuster thus has a bracket and a recess for the bracket, wherein the bracket can be pulled out in relation to the recess in order to facilitate a height adjustment of the headrest. Simultaneously, the bracket can be locked in at least one position by the interaction of the bracket with the recess. Therefore, it is in particular avoided that the headrest accidentally slips downwards in the gravitational direction.

It is functionally and constructively preferable if the lift adjuster can be locked in the gravitational direction in a clamped and/or interlocking manner at least in the lower and/or upper position. The clamped locking can be achieved by means of a wedging effect of the bracket and the recess, while the interlocking locking can be brought about by means of a latching connection. The lift adjuster can be locked in a plurality of positions completely independently of this so as to provide the user with a choice of a plurality of positions of the headrest. By means of an interlocking locking of the lift adjuster, a stepwise locking and adjustment of the lift adjuster can thus easily be achieved, while the clamped locking easily makes locking and adjustment at any position possible. Irrespective of whether a lift adjuster is provided for an interlocking or clamped locking, it is a good idea if when adjusting the lift adjuster into an end position a release mechanism is forcibly actuated which leads to an unlocking of the bracket and recess so that the lift adjuster can be adjusted back into the initial position. By adjusting the lift adjuster into the initial position, the release mechanism can then forcibly be actuated again and thus to be able to offset the release of the bracket and recess so that locking of the lift adjuster can come about again. In this context, full reference is made to the disclosure of DE 10 2014 109 010 A1. On the other hand, an interlocking or locking lift adjuster is described, for example, in DE 87 07 257 U1.

A comfortable and reliable adjustment of the headrest can, for example, be achieved if the headrest adjustment is driven from at least the lower position into the upper position and back by a motorised, in particular electromotive, drive.

Thus, a corresponding motorised drive also facilitates problem-free a continuously adjustment of the headrest, both upwards and downwards. A constructively simple embodiment provides that the motorised drive is formed so as to, in particular directly, move the synchronous strut in rotation. This saves installation space and increases reliability. Alternatively or additionally, the motorised drive can drive a drive gear wheel meshing with a gear wheel element. Thus, the gear wheel element can be very precisely rotated via the drive gear wheel, in opposite directions as required.

For constructive simplification and to save installation space, the motorised drive can be can be designed to be height-adjustable with the headrest adjustment. This means that the motorised drive is not immovably mounted in the seating furniture, but is adjusted in height corresponding to the adjustment of the headrest. This can be realised simply if the motorised drive is secured on a moving part of the headrest adjustment. Thus, from a constructive point of view in particular the synchronous strut and/or the transverse strut are used.

By adjusting the height of the headrest, the tilting of the headrest and/or the arrangement of the headrest forwards and backwards can also be changed, which can result in an increase in comfort for the user. For example, this can be achieved without any problem if the positioning struts are tilted forwards in relation to the seating furniture in the lower position of the headrest and the upper position of the headrest and in particular in the case that the positioning struts are titled further forwards in the upper position of the headrest than in the lower position of the headrest, which can be easily made possible by a correspondingly arranged guide of the positioning struts on the backrest. Alternatively or additionally, the positioning struts can be held pivotably by the headrest adjustment between the lower position of the headrest and the upper position of the headrest, which encourages the tilting of the headrest when adjusting the height of the headrest. In this context, from a constructive point of view it is particularly expedient if the positioning struts are pivotably arranged around the guide and/or the backrest.

The headrest can alternatively or additionally for reasons of comfort be provided pivotably in particular at least from a rear position into a front position, which can be achieved in a simple and reliable manner by means of a locking hinge. The locking hinge can then lock the headrest at least in the front position and/or the rear position. Corresponding locking hinges have corresponding gear tooth systems which mesh together and when adjusting the locking hinge slide off of one another in one direction. The adjustment of the locking hinge in the opposite direction leads to a blocking engagement of the gear tooth system and a locking of the locking hinge in the corresponding position. By adjusting the locking hinge, the gear tooth system can be forcibly brought out of engagement by means of a release mechanism. Thus, the locking hinge can be adjusted back into the initial position, whereby the release mechanism forcibly brings the gear tooth system into engagement again. Now, the locking hinge can again be adjusted in a stepwise manner in the direction of the end position and be locked in at least one position mechanically by means of blocking engagement of the gear tooth systems in one another. Instead of such a pure locking hinge, a locking clamp hinge can also be provided. With locking clamp hinges, the actual adjustment is also carried out in blocking engagement of two gear tooth systems sliding against one another in an adjusting direction. However, the adjustment back again of the locking clamp hinge does not require the tooth systems to be brought out of engagement. Only the clamping forces of the locking clamp hinge must be overcome in order to adjust the levers of the locking clamp hinge otherwise clamping against each other back into the direction of an initial position. Such a locking clamp hinge is described, for example, in the German patent application DE 10 2011 017 301 A1, the disclosed content of which is referenced fully here. In addition, it is also noted that here in principle the blocking tooth systems could be done away with if an adjustment in two directions is initiated by overcoming clamping forces. In this context, clamping hinges or friction joints are also referred to.

Instead of a locking fitting, a motorised drive can also be provided for pivoting the at least one headrest, which allows for comfortable pivoting of the headrest in opposing directions. In order to save installation space, the motorised drive can be integrated into the headrest. For a simple and reliable operation, it can be a good idea if a headrest gear wheel element of the motorised drive meshes with a curved gear rack element of a pivotable section of the headrest for pivoting the headrest.

If at least one part of a positioning strut is designed to be rotatable via the motorised drive, this rotation of the positioning strut can be transformed into a pivoting of the at least one headrest via a transmission element. For simplicity, the transmission element can have semi-conical gear wheels meshing with one another in order to deflect the rotation of the positioning struts for the pivoting of the headrest about a determined angle, in particular approximately 90°.

A compact construction of the seating furniture can be achieved, for example, by arranging the headrest adjustment at least in sections perpendicularly over at least one seat, in particular over at least one seat cushion. Then, the as required moveable seat can be moved below the headrest adjustment, which leads to a reduced construction of the back of the seating furniture. Alternatively or additionally, the positioning struts can be spaced at least 0.5 m, preferably at least 0.8 m, in particular at least 1.2 m apart from one another. The wider the distance is, the more of the advantages described above come into play and the more comfortable it is for the user. The latter applies in particular for the preferred case in which the seating furniture is formed as upholstered furniture.

BRIEF DESCRIPTION OF THE DRAWINGS

The invention is explained in greater detail below by means of a drawing merely depicting exemplary embodiments. In the drawing, FIGS. 5A and 5B show a front view and a side view of the motorised headrest adjustment according to FIGS. 4A and 4B with the headrest in a lower initial position.

DESCRIPTION OF THE INVENTION

Figure 1:
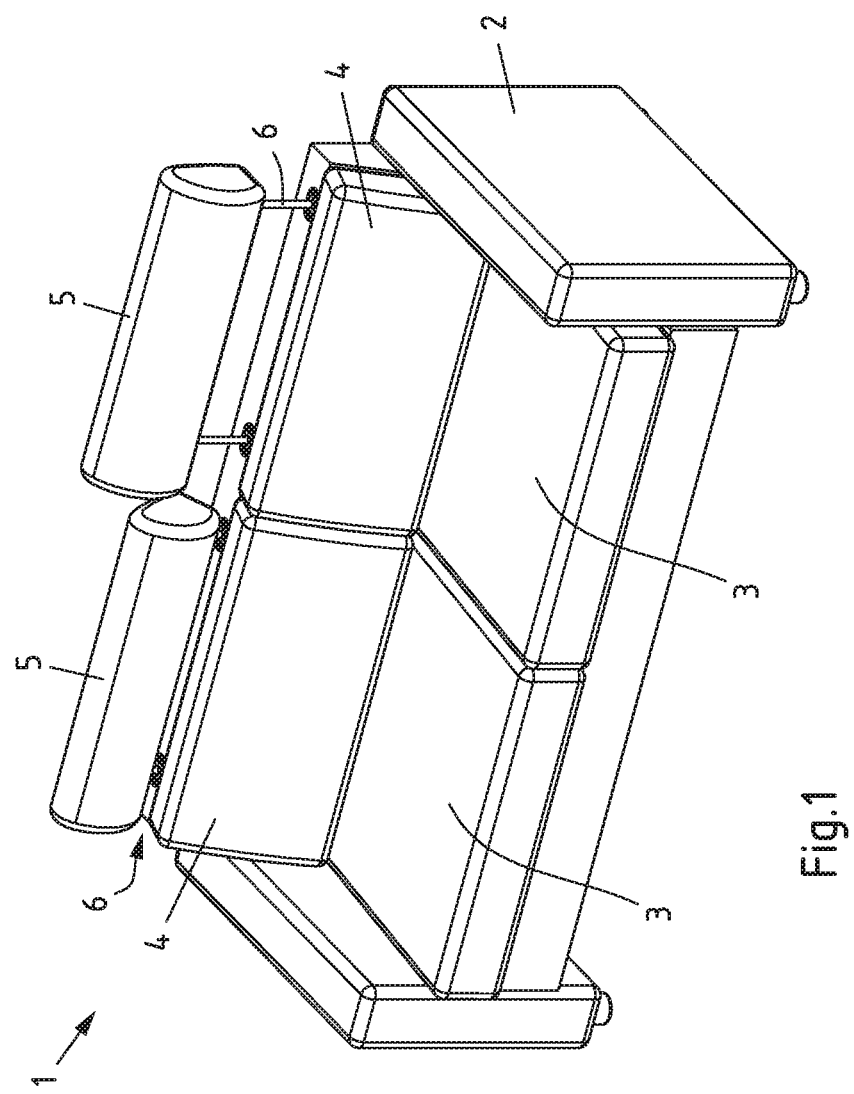
FIG. 1 shows a perspective view of a first seat furniture according to the invention.

FIG. 1 shows seating furniture 1 in the form of a sofa with a frame 2, a seat 3, a backrest 4 arranged above the seat 3 and two height-adjustable headrests 5 arranged above the backrest 4. The left headrest 5 is in a lower initial position and in a state tilted forwards, while the right headrest 5 is in an upper end position and in a state tilted backwards. Here, tilted forwards and tilted backwards can refer to a corresponding tilting in relation to the vertical. However, it can also simply refer to whether the headrest 5 is tilted forwards or backwards. This then only depends on the relative orientation of the headrest 5 in the forwards and backwards tilted state without depending on the absolute orientation to the vertical, both in the forwards and backwards tilted state. In both cases, the headrests 5 are held by positioning struts 6, with the help of which the headrests 5 can be adjusted from the lower initial position into the upper end position and back.

Figure 2A:
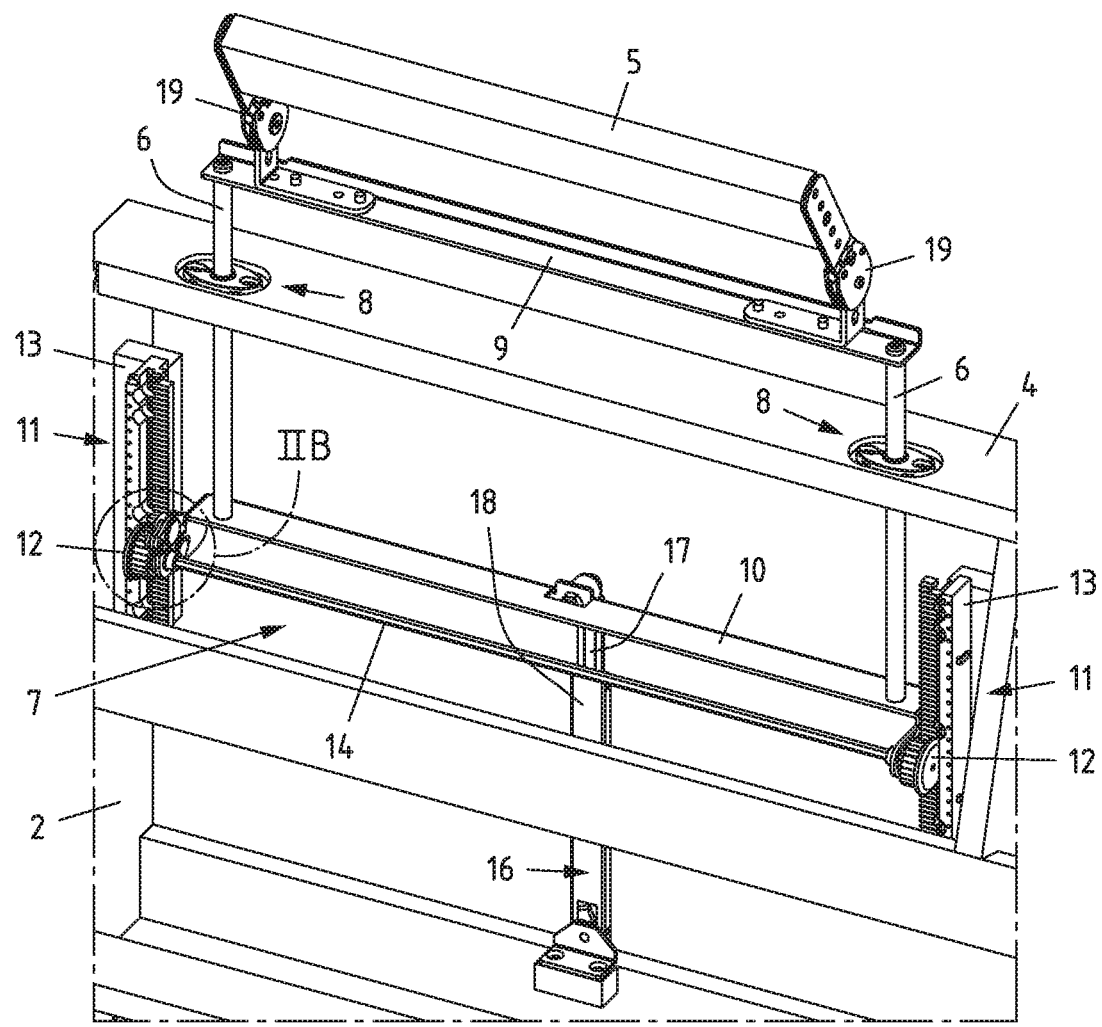
FIGS. 2A and 2B show a perspective detailed view of a manual headrest adjustment of the seating furniture from FIG. 1, FIGS. 3A and 3B show a perspective view and a plan view of a guide of the headrest adjustment from FIGS. 2A and 2B, FIGS. 4A and 4B show a front view and a side view of a motorised headrest adjustment of a second seating furniture according to the invention with the headrest in an upper end position.
Figure 2B:
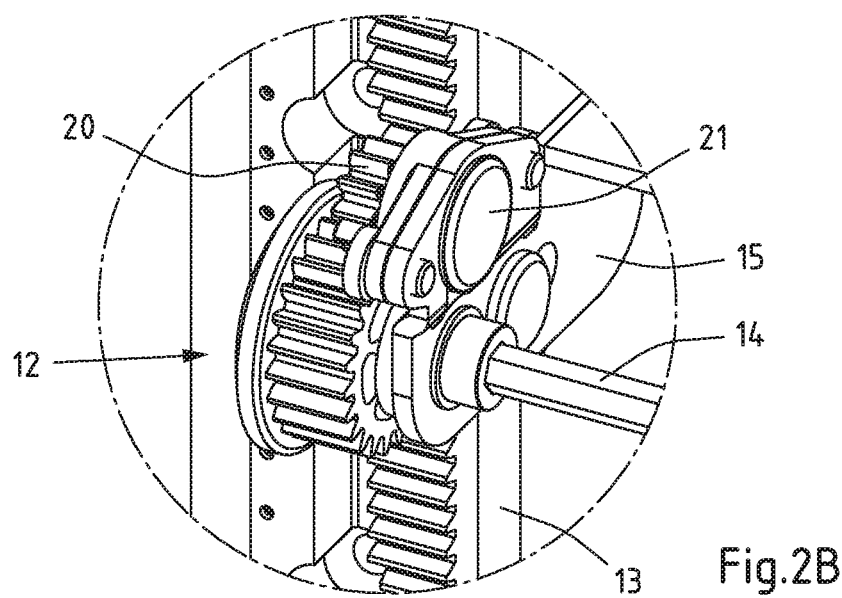

FIGS. 2A and 2B show detailed views of a manual headrest adjustment 7 of the seating furniture 1, wherein for better clarity the cushion of the seating furniture 1 has been omitted. The positioning struts 6 of the headrest adjustment 7 are fed through the openings 8 in the backrest 4 and connected to one another in the region of their upper ends and in the region of their lower ends via the transverse struts 9, 10. Thus, the upper transverse strut 9 is part of the headrest 5, while the lower transverse strut 10 is part of the headrest adjustment 7. The headrest adjustment 7 also has a guide 11 assigned to each positioning strut 6, which provides the height-adjustability of the headrest 5 and the positioning struts 6.

The guides 11 have a gear wheel element 12 which is securely connected to the corresponding positioning strut 6, and a gear rack element 13 which is securely connected to the frame 2 or the backrest 4 of the seating furniture 1 and is in meshing engagement with the gear wheel element 12. In addition, the two gear wheel elements 12 of the headrest adjustment 7 shown are coaxially connected via a coaxially arranged synchronous strut 14. In this way, it can be achieved that the gear wheel elements 12 rotate correspondingly and at the same speed of rotation. While the gear wheel elements 12 rotate, they mesh with the corresponding gear rack elements 13 and roll on these upwards or downwards, whereby the connected headrest 5 is raised or lowered. The gear wheel elements 12 are further formed such that they engage around the corresponding gear rack elements 13 with connecting sections 15 and thus perpendicular to the gear rack elements 13 form an interlocking between the gear wheel elements 12 and the gear rack elements 13. Here, the interlocking acts substantially in a horizontal plane, namely in two spatial directions perpendicular to one another.

The shown and thus far preferred headrest 5 can only be adjusted mechanically. However, a continuously height adjustment of the headrest 5 is possible. So that the headrest 5 does in a determined position not accidentally move downwards the headrest adjustment 7 is provided with a lift adjuster 16. In the shown and thus far preferred seating furniture 1, the bracket 17 of the lift adjuster 16 is height-adjustably secured on the transverse strut 10 of the headrest adjustment 7 and the recess 18 of the lift adjuster 16 is immovably secured on the frame 2 of the seating furniture 1. Thus, the bracket 17 can be pulled out in relation to the recess 18. However, if the bracket 17 is pushed back into the recess 18, the bracket 17 is then held in a clamping manner in the corresponding position. However, in the pulled out end position of the lift adjuster 16 a release mechanism is then active which allows for adjusting back into the pushed in initial position of the lift adjuster 16 in which the release mechanism is again activated and the lift adjuster 16 is correspondingly reset in order to be held in a clamped manner again after another partial pulling out of the bracket 17 from the recess 18. The lift adjuster 16 is preferably formed in accordance with DE 10 2014 109 010 A1.

The shown and thus far preferred headrest 5 is not only height-adjustable, but also designed to pivot independently of the height adjustment. Thus, the headrest 5 has a locking hinge 19 on each of the opposing sides which facilitates stepwise pivoting of the headrest 5 and prevents accidental pivoting back of the headrest 5. However, this is only possible after adjusting the locking hinge 19 into the front end position, wherein a release mechanism brings two gear tooth systems out of engagement. Then, the locking hinge 19 can be reset into the rear initial position where the release mechanism is once again actuated so that the gear tooth systems can again be brought into engagement with one another. If the headrest 5 is again pivoted forwards, the gear tooth systems slide on one another. However, if the headrest 5 is loaded in the opposite direction, the gear tooth systems form a blocking opposing engagement. An exemplary locking hinge 19 of the described type is described in more detail in DE 20 2007 006 758 U1.

In particular in the detailed view according to FIG. 2B, a damping gear 20 is shown which is driven via the gear wheel element 12 also shown. Thus, the gear wheel element 12 and the damping gear 20 are in meshing engagement. The damping gear 20 is thus secured on the guide 11 and/or the transverse strut 10 via a damping element 21 which meets the rotation of the damping gear 20 when adjusting the headrest 5 upwards with a much lower resistance than when adjusting the headrest 5 downwards. Thus, the adjustment of the headrest 5 downwards is damped differently to the adjustment of the headrest 5 upwards. The gear wheel element 12 is thus indirectly damped. If the damping element 21 were integrated into the gear wheel of the gear wheel element 12, there would be a direct damping of the gear wheel element 12.

A detailed view of the guide 11 is shown in FIGS. 3A and 3B. The shown and thus far preferred gear rack element 13 is formed in a linear and two-part manner. The two individual parts 22, 23 of the gear rack element 13 are identical to one another and are inserted into one another with corresponding locking profiles 24, 25 in an interlocking manner. In addition, recesses 26 for an end switch 27 are provided along the gear rack element 13, in particular at regular intervals. By means of the recesses 26, end switches 27 can be simply and quickly as well as at different predetermined positions screwed to the gear rack element 13 in order to position the end switches 27 in a fixed manner. The end switches 27 are useful in a motorised adjustment of the headrest 5 in order to end the adjustment when the gear wheel element 12 or the headrest 5 has reached an upper end position or a lower initial position. For purely manual adjustment of the headrest 5, the end switches 27 can be dispensed with. The shown and thus far preferred gear wheel element 12 has a side plate 28 with a larger diameter than the gear ring of the gear wheel element 12 which on reaching the end switch 27 shifts a push button 29 parallel to the axis of rotation of the gear wheel element 12 in order to actuate the end switch 27.

Figure 4A:
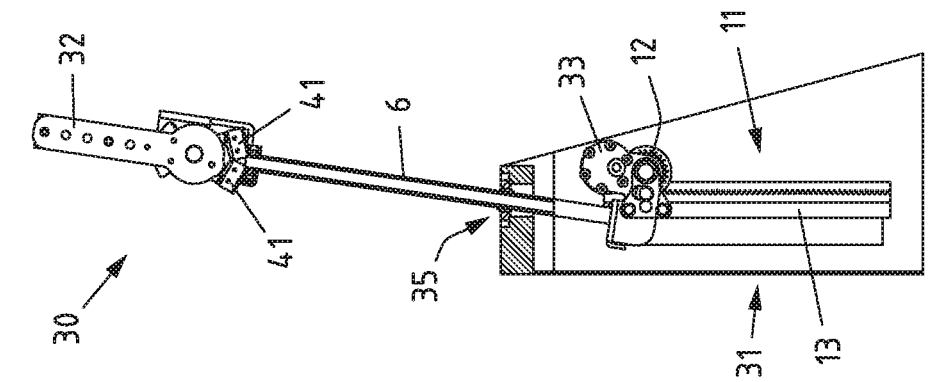
Figure 4B:
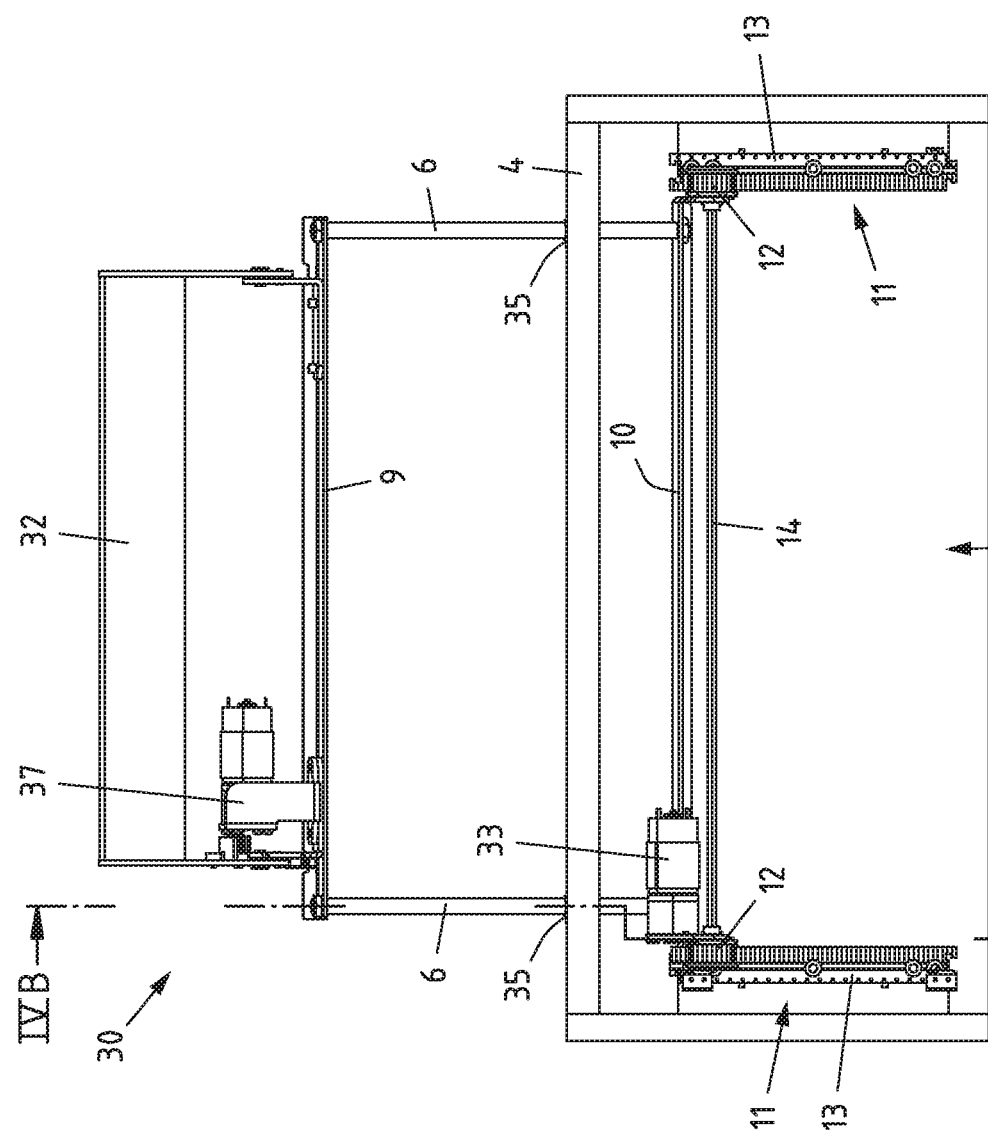
Figure 6C:
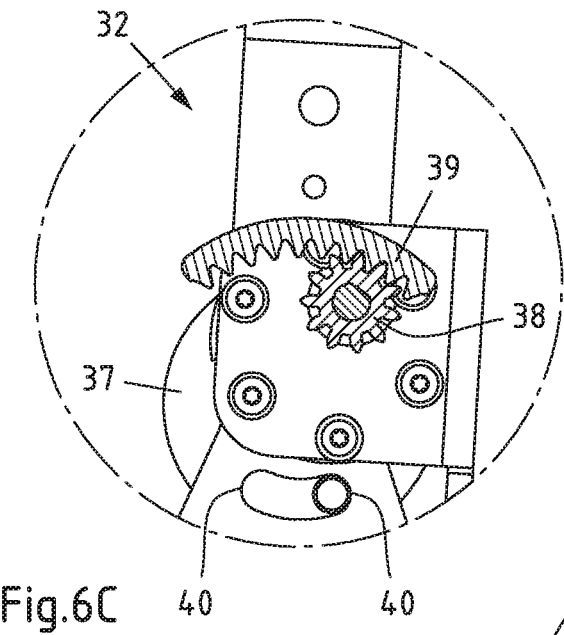
FIGS. 6A-6C show vertical cross-sections of several details of the headrest rest adjustment according to FIGS. 4A and 4B, and FIGS. 7A and 7B show a perspective detailed view of a motorised headrest adjustment of a third seating furniture according to the invention.
Figure 6B:
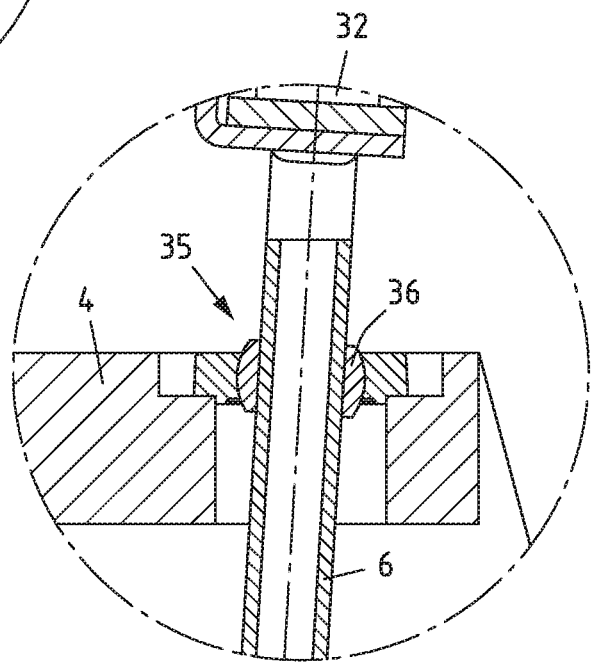
Figure 6A:
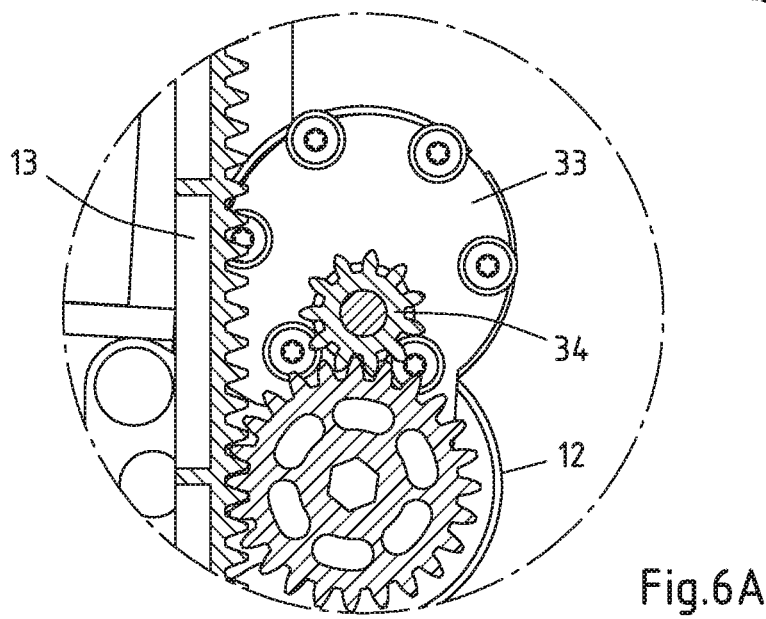

An alternative seating furniture 30 with an alternative headrest adjustment 31 is shown in FIGS. 4A and 4B. The headrest adjustment 31 is constructed in a very similar way to the previously described headrest adjustment 7 which is why the same components are provided with the same reference numerals. The headrest adjustment 31 shown in the upper end position facilitates an electromotive height adjustment and independently of this electromotive pivoting of the headrest 32 forwards and backwards. The motorised drive 33 for the height adjustment of the headrest 32 is fixed on and/or attached to the transverse strut 10 between the positioning struts 6 of the headrest adjustment 31. Consequently, when adjusting the headrest 32 the motorised drive 33 moves up and down with this. Here, reference is made to FIGS. 5A and 5B, which show the same seating furniture 30 with the headrest adjustment 31 in the lower initial position. In particular in FIG. 5B and the corresponding detailed view in FIG. 6A it is also shown that the electromotive drive 33 drives a drive gear wheel 34 which is engaged with the gear wheel element 12 and rotates this in the desired direction. Subsequently, the gear wheel element 12 rolls upwards or downwards on the gear rack element 13.

The positioning struts 6 are also fixed in the lower initial position and in the upper end position opposite the bushing 35 of the positioning struts 6 on the backrest 4 shifted backwards on the respective guides 11. Thus, it is achieved that the headrest 32 can be simultaneously adjusted upwards and forwards as well as downwards and backwards. In the embodiment of the seating furniture 30 shown, the headrest 32 performs a pendulum movement forwards and backwards during the height adjustment. In order, in this case, or in principle, to avoid wedging of the positioning struts 6 on the backrest 4, either sufficient play and/or a mounting of the positioning struts 6 on the backrest 4 via universal ball joints 36 can be provided. The latter can be seen in particular in the detailed view of FIG. 6B. Furthermore, the positioning struts 6 are mounted on the guide 11 so as to pivot about an at least substantially horizontal axis and/or an axis at least substantially parallel to the axis of rotation of the gear wheel element 12.

Independently of the height adjustment of the headrest 32, this can also be pivoted forwards and back, for which purpose a further motorised, in particular electromotive, drive 37 is provided. The motorised drive 37 is securely integrated into the headrest 32 and is adjusted up and down with it. For this purpose, the motorised drive 37 is mounted on a transverse strut 9 and rotates a headrest gear wheel element 38 which meshes with a curved gear rack 39 of the headrest 32. Thus, the headrest gear wheel element 38 can pivot forwards and backwards in the corresponding direction of the headrest 32 by rotating. This can be seen in particular in FIG. 6C. Here, two stops 40 are also shown which limit the pivoting of the headrest 32 in the front end position and the rear initial position. In these positions, the end switches 41 shown in FIG. 4B come into effect and switch off the motorised drive 37.

FIGS. 7A and 7B show a section of further alternative seating furniture 50. Here too, due to the great deal of similarity, the same components are again provided with the same reference numerals. However, there is a substantial difference in the electromotive drives 51, 52. The motorised drive 51 of the height adjustment does not drive a drive gear wheel 34 as in FIGS. 4A-6C, but directly drives the synchronous strut 14 which is connected to the gear wheel elements 12 or the gear rings of the gear wheel elements 12 in a torsion-resistant and concentric manner. However, the motorised drive 51 is secured on the lower transverse strut 10 between the positioning struts 6.

The motorised drive 52 for pivoting the headrest 53 is also secured on the lower transverse strut 10 between the positioning struts 6, 54 and rotates at least in sections the corresponding positioning strut 54 about its longitudinal axis. The positioning strut 54 is provided on its upper end with a conically tapered gear ring 55 which is in meshing engagement with a corresponding, also conically tapered gear ring 56 of a transmission element 57 for transmitting the rotation of the positioning strut 54 into a pivoting of the headrest 53. Thus, the at least substantially vertical rotation of the positioning strut 54 is transformed into a pivoting about an at least substantially horizontal axis. However, other angular relationships could also be conceivable. Preferably, the transmission element 57, for instance of the headrest adjustment 58, is formed as an angular gear or a bevel gear as in FIG. 7B.

A locking hinge, as is shown in FIG. 2A, is avoided with the seating furniture according to FIG. 7A and FIGS. 4A-5B.

LIST OF REFERENCE NUMERALS

1 Seating furniture
2 Frame
3 Seat
4 Backrest
5 Headrest
6 Positioning strut
7 Headrest adjustment
8 Opening
9,10 Transverse strut
11 Guide
12 Gear wheel element
13 Gear rack element
14 Synchronous strut
15 Connecting section
16 Lift adjuster
17 Bracket
18 Recess
19 Locking hinge
20 Damping gear
21 Damping element
22,23 Individual part
24,25 Locking profile
26 Recesses
27 End switch
28 Plate
29 Push button
30 Seating furniture
31 Headrest adjustment
32 Headrest
33 Drive
34 Drive gear wheel
35 Bushing
36 Universal ball joints
37 Drive
38 Headrest gear wheel element
39 Gear rack
40 Stops
41 End switch
50 Seating furniture
51,52 Drive
53 Headrest
54 Positioning strut
55,56 Gear ring
57 Transmission element 58 Headrest adjustment

The invention claimed is:
1. A seating furniture, in particular an armchair or sofa, with at least one backrest, at least one headrest and at least one headrest adjustment, wherein the headrest is held adjustable by means of the headrest adjustment relative to the at least one backrest at least from a lower position into an upper position, wherein the headrest adjustment has two height-adjustable positioning struts bearing the headrest and each guided via a separate guide for adjusting the at least one headrest from the lower position into the upper position and back, wherein the guides each have a gear rack element and a gear wheel element meshing with the gear rack element when adjusting the headrest from the lower position to the upper position and back, and wherein the gear wheel elements are connected to one another in a torsion-resistant manner via a synchronous strut, and further wherein the positioning struts are connected to one another via at least one transverse strut which is height-adjustable together with the headrest and wherein the positioning struts are connected to the guides via the transverse strut.

2. The seating furniture according to claim 1, wherein the synchronous strut is coaxially connected to the gear wheel elements and wherein the synchronous strut is arranged coaxially with the gear wheel elements.

3. The seating furniture according to claim 1, wherein at least one gear rack element comprises several parts, in particular two parts, preferably identical parts, and wherein the at least two individual parts of the gear rack element are inserted into one another in an interlocking manner.

4. The seating furniture according to claim 1, wherein at least one gear rack element has a series of recesses for mounting at least one end switch to limit an adjustment track of the headrest in various different positions, wherein an end switch has a push button for actuating in a direction at least substantially parallel to the synchronous strut and/or substantially parallel to the axis of rotation of the corresponding gear wheel element.

5. The seating furniture according to claim 1, wherein at least one gear wheel element of one of the gear rack elements is configured to engage behind, in particular engage around, in an interlocking manner, while the headrest is adjusted from the lower position into the upper position and back, wherein at least one gear wheel element is directly or indirectly assigned a damping element which opposes the downwards adjustment of the headrest with a greater resistance than the upwards adjustment of the headrest.

6. The seating furniture according to claim 1, wherein a lift adjuster for locking the headrest at least in the lower and/or upper position is provided and wherein the lift adjuster is connected to the transverse strut and/or the synchronous strut.

7. The seating furniture according to claim 6, wherein the lift adjuster is configured to be locked in the gravitational direction in a clamped and/or interlocking manner at least in the lower and/or upper position, wherein the lift adjuster is configured to be locked in a stepwise manner at a plurality of positions between the lower and the upper position.

8. The seating furniture according to claim 1, wherein the headrest adjustment is driven by means of a motorised drive from at least the lower position into the upper position and back, wherein the motorised drive is formed so as to rotate the synchronous strut and/or to drive at least one drive gear wheel meshing with a gear wheel element.

9. The seating furniture according to claim 8, wherein the motorised drive is configured to be height-adjustable with the headrest adjustment and wherein the motorised drive is fixed on the synchronous strut and/or the transverse strut.

10. The seating furniture according to claim 1, wherein the positioning struts are tilted forwards in relation to the seating furniture in the lower position of the headrest and the upper position of the headrest and wherein the positioning struts are tilted further forwards in the upper position of the headrest than in the lower position of the headrest and/or the positioning struts are held by the headrest adjustment so as to swivel between the lower position of the headrest and the upper position of the headrest, around the guide and/or the backrest.

11. The seating furniture according to claim 1, wherein the headrest is provided pivotably at least from a rear position into a front position and wherein the headrest can be locked in the front position and/or the rear position via at least one locking hinge.

12. The seating furniture according to claim 11, wherein a motorised drive is provided for pivoting the at least one headrest, wherein the motorised drive is integrated into the headrest and wherein a headrest gear wheel element of the motorised drive meshes with a curved gear rack element of a pivotable section of the headrest.

13. The seating furniture according to claim 11, wherein at least one part of a positioning strut is configured to be rotatable via a motorised drive, wherein a transmission element is provided for transmitting the rotation of the positioning strut into a pivoting of the at least one headrest.

14. The seating furniture according to claim 1, wherein the headrest adjustment is arranged at least in sections perpendicularly above at least one seat or seat cushion, wherein the positioning struts are spaced at least 0.5 m apart from one another, and wherein the seating furniture is formed as a piece of upholstered furniture.

15. A seating furniture, in particular an armchair or sofa, with at least one backrest, at least one headrest and at least one headrest adjustment, wherein the headrest is held adjustable by means of the headrest adjustment relative to the at least one backrest at least from a lower position into an upper position, wherein the headrest adjustment has two height-adjustable positioning struts bearing the headrest and each guided via a separate guide for adjusting the at least one headrest from the lower position into the upper position and back, wherein the guides each have a gear rack element and a gear wheel element meshing with the gear rack element when adjusting the headrest from the lower position to the upper position and back, and wherein the gear wheel elements are connected to one another in a torsion-resistant manner via a synchronous strut, and further wherein at least one gear rack element has a series of recesses for mounting at least one end switch to limit an adjustment track of the headrest in various different positions, wherein an end switch has a push button for actuating in a direction at least substantially parallel to the synchronous strut and/or substantially parallel to the axis of rotation of the corresponding gear wheel element.

16. A seating furniture, in particular an armchair or sofa, with at least one backrest, at least one headrest and at least one headrest adjustment, wherein the headrest is held adjustable by means of the headrest adjustment relative to the at least one backrest at least from a lower position into an upper position, wherein the headrest adjustment has two height-adjustable positioning struts bearing the headrest and each guided via a separate guide for adjusting the at least one headrest from the lower position into the upper position and back, wherein the guides each have a gear rack element and a gear wheel element meshing with the gear rack element when adjusting the headrest from the lower position to the upper position and back, and wherein the gear wheel elements are connected to one another in a torsion-resistant manner via a synchronous strut, and further wherein at least one gear wheel element of one of the gear rack elements is configured to engage behind, in particular engage around, in an interlocking manner, while the headrest is adjusted from the lower position into the upper position and back.

17. The seating furniture according to claim 16, wherein at least one gear wheel element is directly or indirectly assigned a damping element which opposes the downwards adjustment of the headrest with a greater resistance than the upwards adjustment of the headrest.

\* \* \* \* \*